United States Patent [19]

Staggs

[11] 3,979,906

[45] Sept. 14, 1976

[54] ANTI-POLLUTION EXHAUST SYSTEM FOR VEHICLES

[76] Inventor: George W. Staggs, 967 Pine, NW., Grand Rapids, Mich. 49504

[22] Filed: Aug. 2, 1974

[21] Appl. No.: 494,055

[52] U.S. Cl. .................. 60/310; 55/222; 55/256; 55/267; 60/320
[51] Int. Cl.² .......................................... F01N 3/04
[58] Field of Search ............ 60/309, 310, 315, 320; 55/DIG. 30, 222, 255, 256, 465, 267

[56] References Cited
UNITED STATES PATENTS

| | | | |
|---|---|---|---|
| 2,038,313 | 4/1936 | Placko | 55/DIG. 30 |
| 2,409,825 | 10/1946 | Baringoltz | 55/DIG. 30 |
| 2,591,187 | 4/1952 | Nelson | 60/309 |
| 2,904,958 | 9/1959 | Solnick | 55/DIG. 30 |
| 3,153,579 | 10/1964 | Levey | 60/310 |
| 3,485,015 | 12/1969 | Vecchio | 55/256 |
| 3,618,314 | 11/1971 | Krebs | 60/310 |
| 3,630,030 | 12/1971 | Wagner | 60/310 |
| 3,642,259 | 2/1972 | Bowden | 60/310 |
| 3,732,695 | 5/1973 | Shaw | 60/309 |
| 3,875,743 | 4/1975 | Mercer | 60/310 |

*Primary Examiner*—Douglas Hart
*Attorney, Agent, or Firm*—Price, Heneveld, Huizenga & Cooper

[57] ABSTRACT

An anti-pollution exhaust system for vehicular-mounted internal combustion engines. The exhaust system is separate from but cooperates with the normal engine cooling system and supplements the normal engine exhaust system. Engine exhaust gases are conveyed to and mixed with a liquid such as water or an antifreeze solution in a receiving tank. The liquid dissolves and retains therein both soluble and solid pollutants from the gases. The cleansed gases are separated from the pollutant-retaining liquid and vented to the atmosphere by a separating tank. Pumps driven by the engine are included to recirculate the pollutant-adsorbing liquid in the exhaust system. Means for cooling the exhaust gases prior to mixing with the liquid are included.

19 Claims, 5 Drawing Figures

ANTI-POLLUTION EXHAUST SYSTEM FOR VEHICLES

BACKGROUND OF THE INVENTION

This invention relates to exhaust systems for vehicles having internal combustion engines and, more particularly, to exhaust systems for such engines which reduce and eliminate pollution from the exhaust of such engines.

Recent governmental pollution control requirements in the United States and other countries have spawned many anti-pollution exhaust systems and pollutioncontrol systems for internal combustion engines. Such control standards generally limit the emissions of hydrocarbons, carbon monoxide, oxides of nitrogen, and smoke (minute solid particles) from the exhausts of vehicles. Many of the prior known systems have utilized filtering devices such as activated charcoal filters, liquid filters, various filtering screens, and the like. Some require the use of particular chemicals making them expensive to use and operate. In certain of the prior systems, water or another liquid is sprayed into the exhaust from an internal combustion engine, allowed to pass through the normal muffling devices of the exhaust system and thereafter is separated into liquid and gas portions. Sudh systems have tended to be complicated and therefore expensive and difficult to maintain.

It has recently been discovered that a simplified, compact anti-pollution, exhaust-purifying, exhaust system for vehicles having internal combustion engines is possible based on the principle of liquid scrubbing. Such system utilizes water or commonly available antifreeze solutions of the type normally used in the cooling systems of automobiles or other vehicles and eliminates the need for complex apparatus, uncommon, expensive chemicals, and other inconveniences which have made prior known systems impractical.

In addition, certain exhaust systems for reducing air pollution require the use of non-leaded or unleaded gasoline for proper operation. The present system allows the use of any type of fuel including all grades of gasoline, diesel fuels, and the like.

SUMMARY OF THE INVENTION

Accordingly, it is the purpose of the present invention to provide an anti-pollution, exhaust-purifying exhaust system for vehicles having internal combustion engines. The system is compact, may be incorporated in present day automobiles or other vehicles, is simple to operate and maintain and is reliable in operation. The exhaust system is based on the principle of liquid scrubbing wherein the exhaust gases are mixed with a liquid which dissolves certain soluble gases and retains certain solid particles present in the gases after which the liquid gas mixture is separated into liquid and gas portions with pollutants from the exhaust gases remaining in the liquid portion. The gas portion is vented to the atmosphere in a cleansed state.

The present system is self-contained, is separate from the normal internal combustion engine cooling system, but works in conjunction with and cooperates with that cooling system. The system is compact with the majority of its elements being fitted in the engine compartment adjacent the internal combustion engine and its cooling system. Further, the system relies on the engine as a source of power and therefore requires no other power source for operation.

In one aspect of the invention, an anti-pollution exhaust system is defined in combination with an internal combustion system mounted in a vehicle including receiving tank means for receiving a quantity of liquid including means for mixing exhaust gases from the internal combustion engine with the liquid to form an exhaust liquid mixture in the receiving tank. Separating tank means are included for receiving the mixture from the receiving tank means including separating means for separating the liquid from the gases while leaving pollutants from the gases in the said liquid and vent means for venting the separated, cleansed gases to the atmosphere. Exhaust gas conduit means are provided for conveying exhaust gases from the engine to the receiving tank. First and second fluid conduit means are provided for conveying fluid from the receiving tank to the separator tank and also for conveying fluid from the separating tank back to the receiving tank. Pump means are included for pumping fluid through the conduit means. Means for driving the pump with the internal combustion engine are also provided such that the entire system cleanses the exhaust gases via the liquid before those gases escape to the atmosphere.

In other aspects of the invention, an anti-pollution exhaust system is defined for incorporation with an internal combustion engine mounted in a vehicle, the system including elements similar to those mentioned above in addition to cooling means provided in the exhaust gas conduit means for cooling the exhaust gases prior to their mixture with the cleansing liquid in the receiving tank means. In the preferred embodiment, either water or an antifreeze solution based on ethylene glycol is used as the scrubbing liquid.

These and other objects, advantages, purposes, and features of the invention will become more apparent from a study of the following description taken in conjunction with the drawings.

DESCRIPTION OF THE PREFERRED EMBODIMENT

Figure 1:
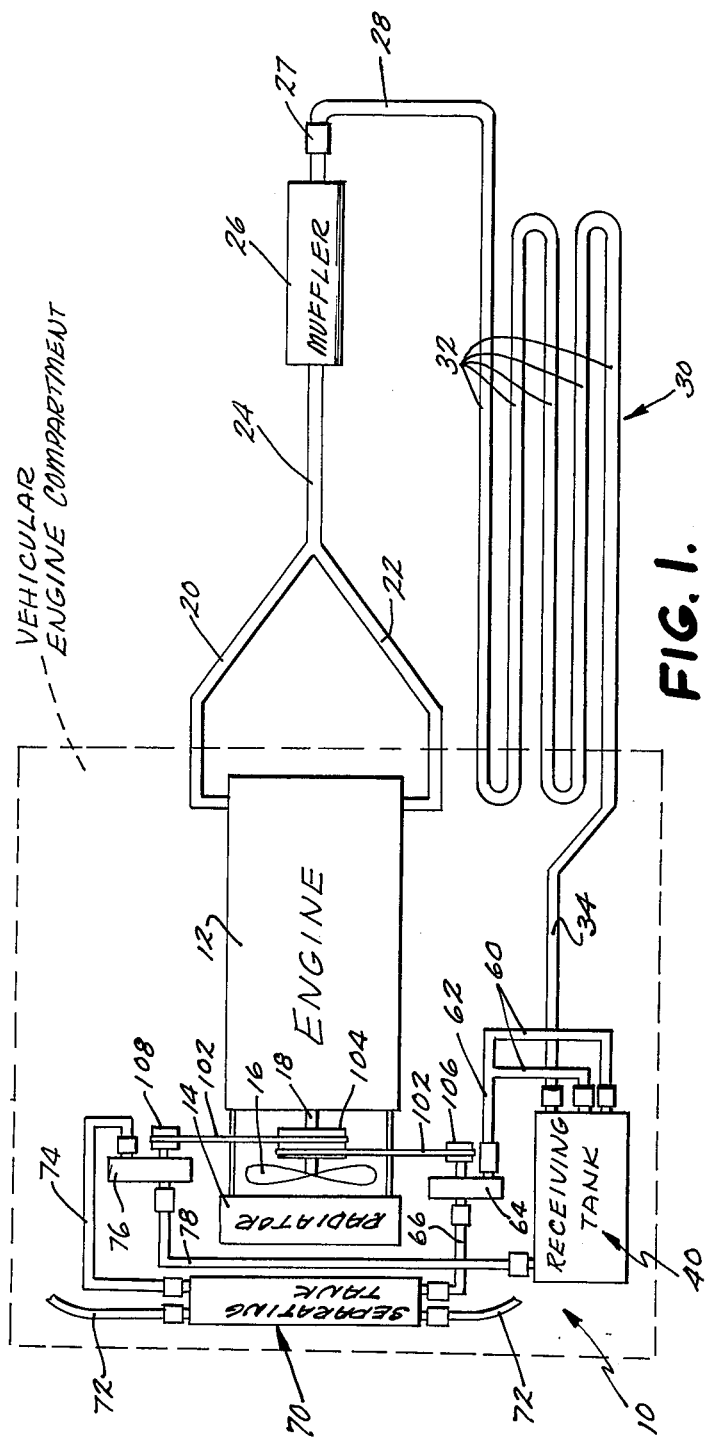
FIG. 1 is a schematic illustration of the antipollution exhaust system of the present invention incorporated with a typical internal combustion engine having its own separate liquid cooling system.

Referring now to the drawings in greater detail, FIG. 1 illustrates the anti-pollution exhaust system 10 of the present invention as incorporated with typical internal combustion engine 12 on an automobile or other vehicle. The engine 12 includes a conventionally known, liquid-type cooling system including a radiator 14 and a fan 16 powered by the engine via a rotating shaft 18. The fan draws a flow of cooling air through the radiator core to transfer heat from the water or other liquid coolants contained in the radiator. The coolant is in turn circulated through the engine to cool the same. The exhaust gases resulting from operation of the engine 12 are conducted from the engine in the conventionally known manner via tubular pipes 20 and 22 leading to an exhaust pipe 24 in which a conventionally known muffler 26 is included to muffle the exhaust noise. The exhaust system 10 of the present invention is adapted to connect with the exhaust pipe 24 after the position of the muffler at the rear of the vehicle and to convey the exhaust gases forwardly to the primary portions of the exhaust system 10 located in the engine compartment of the vehicle.

As illustrated in FIG. 1, an exhaust gas conduit or pipe 28 leads from a suitable pipe connection or joint 27 behind the muffler to an exhaust cooling apparatus 30 forming a portion of the pipe 28. The exhaust cooling apparatus 30 includes portions of pipe 28 formed into elongated loops or lengths 32 providing the pipe with an overall sinuous path in the cooling portion. The cooling portion of the pipe is preferably mounted below the rear of the vehicle such that it is exposed to the flow of air under the vehicle when the vehicle is in motion causing the air to contact all portions of the loops 32 to transfer heat therefrom and to cool the exhaust gases within the pipe. In the form illustrated in FIG. 1, the lengths of pipe 32 in the cooling portion 30 extend lengthwise of the vehicle generally parallel to its direction of motion.

Figure 2:
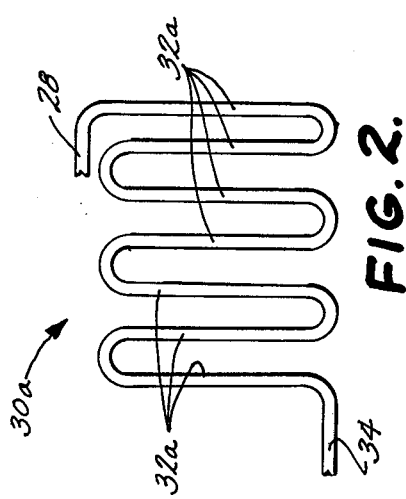
FIG. 2 is a fragmentary view of a portion of another embodiment of the exhaust system illustrating an alternative, sinuous path forming the cooling means for the exhaust gas conduit.

As an alternative to the cooling portion 30 shown in FIG. 1, a cooling portion 30a as illustrated in FIG. 2 may be used. With embodiment 30a, pipe 28 leads to a portion of the pipe bent into a sinuous path and including lengths or loops 32a extending transverse of the vehicle on which the system 10 is mounted. As with embodiment 30, embodiment 30a of the cooling portion of the exhaust pipe is located beneath the rear of the vehicle and exposed to the atmosphere and air flow thereunder to cause heat transfer from the pipe. The transverse loops or lengths 32a may be used in vehicles where there is less space or other structure preventing pipes from being located lengthwise under the vehicle.

With either cooling portion 30 or 30a, exhaust pipe portion 34 extends from the end of the cooling portion and is connected to receiving tank 40. Within receiving tank 40, the exhaust gases are mixed with a scrubbing liquid after which the pressure of the exhaust entering the tank plus the suction provided by a pump 64 conducts the mixture through outlet conduits 60 leading to fluid conduit 62. Conduit 62 is in turn connected to fluid pump 64 which helps draw the mixture from the receiving tank through conduit 66 into the separating tank 70.

When the exhaust liquid mixture enters separating tank 70, it is forced against an internal wall of the tank to separate the pollutant-containing liquid portion from the cleansed gas portion. The cleansed gas portions rise to the top of the tank and exit through vent conduits 72. The liquid portion drops to the bottom of the tank from which position it is withdrawn via outlet conduit 74 leading to a second pump 76.

Fluid pump 76 facilitates the withdrawal of the pollutant-containing liquid from the tank 70 and forces it through the return conduit 78 into the bottom of receiving tank 40. Accordingly, the scrubbing liquid contained in the exhaust system 10 circulates in a closed path between receiving tank 40 and separating tank 70. Although a portion of the liquid is continually lost through vent conduits 72 in the form of vapor not completely separated from the exhaust gases, water vapor formed as a portion of the products of combustion from the internal combustion engine 12 is continuously being added to the system in receiving tank 40 via condensation in the various exhaust pipes. Thus, the liquid level in the system stays at a fairly constant level and requires replenishment only infrequently or after long periods of operation when the liquid becomes saturated with pollutants.

Preferably, the liquid used in the system is water or an antifreeze solution although other types can be used. Antifreeze solutions which have been found suitable are of the ethylene glycol based type although other types may be used. Depending on climatic conditions, one or the other type of liquid may be used to allow year-around operation.

Figure 4:
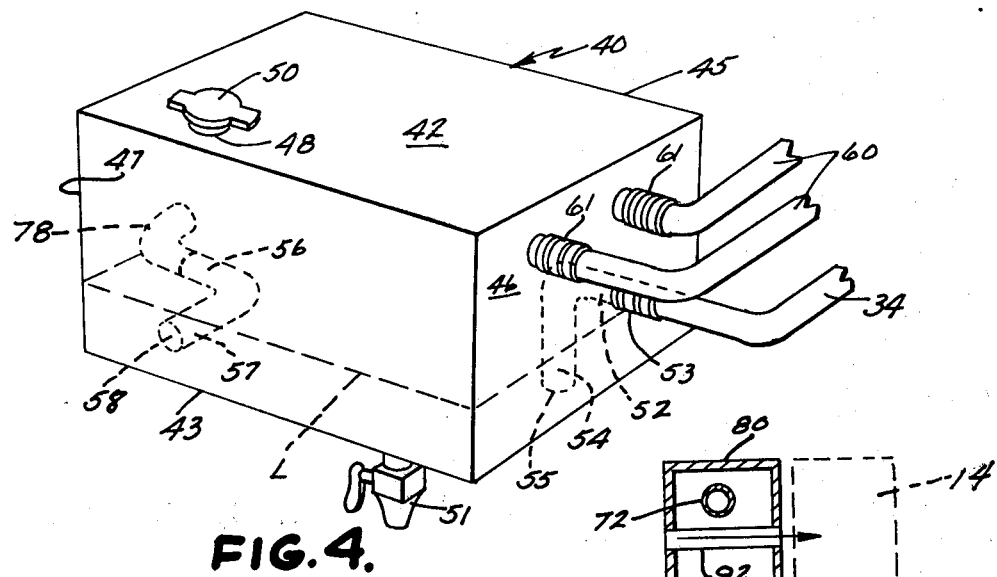
FIG. 4 is a perspective view of the receiving tank illustrated with the exhaust system in FIG. 1.

Referring to FIG. 4, receiving tank 40 comprises a rectangular metallic tank having top and bottom walls 42 and 43, opposing side walls 44 and 45 and opposing end walls 46 and 47. A quantity of the scrubbing liquid L is maintained at a predetermined level within the tank, the liquid being originally inserted through a suitable filling aperture 48 closed by a suitable, removable closure cap 50. Conventional manually operated valve means 51 are provided from the bottom 43 of tank 40 to drain the liquid from the tank when desired.

Insertion of the exhaust gases into the tank 40 is accomplished via a rigid insertion tube or conduit 52 extending generally horizontally into the tank through end wall 46 for connection to exhaust pipe 34 via a suitable pipe connector or joint 53. Insertion tube 52 includes a downwardly extending portion 54 which extends below the liquid level of liquid L in the tank and includes an outlet opening 55 below that level. Accordingly, the pressure of the exhaust passing through the exhaust system from the engine forces the exhaust gases out of opening 55 in a turbulent manner such that they strike against the bottom 43 inside the tank and completely mix with the liquid L.

Pipes 60, which lead to conduit 62 and pump 64, are connected to the tank 40 by suitable pipe connectors or joints 61. These outlet pipes are positioned close to the top of the receiving tank (see FIG. 4) so that not all of the liquid will be drawn out of the tank. Thus, placement of outlets 60 above the liquid level causes a portion of the liquid to remain in the tank for mixture with the incoming exhaust gases while a portion of the exhaust gasliquid mixture exits through the outlets.

Return of the separated, pollutant-containing scrubbing liquid L from the separating tank 70 via conduit 78 to receiving tank 40 is accomplished via a return tubular conduit 56 extending through end wall 47. Conduit 56 includes a right angle bend and a portion 57 ending in an outlet opening 58 located below the level of liquid L. The returning liquid L is forced against the inside of wall 44 providing additional turbulence which helps mix exhaust gases with the liquid in the tank. Outlet 58 is positioned below the liquid level in tank 40 to prevent the pressure of the exhaust gases entering and within tank 40 from obstructing the return of the liquid from tank 70 through line 78. Thus, the effect of any back pressure is minimized. Generally, the receiving tank is small enough to be included within the engine compartment of the vehicle on which the system is mounted (see FIG. 1). The liquid L is normally maintained at a level approximating one-third the height of the tank.

Although the preferred embodiment includes two pumps 64 and 76, it is possible to remove pump 64 and operate the system without it. In that case, the pressure of the incoming exhaust gases from outlet 34 forces the exhaust-liquid mixture out through outlet conduits 60. Also, pump 76, provides some drawing effect through tank 70 and conduits 66, 62, and 60.

Figure 3:
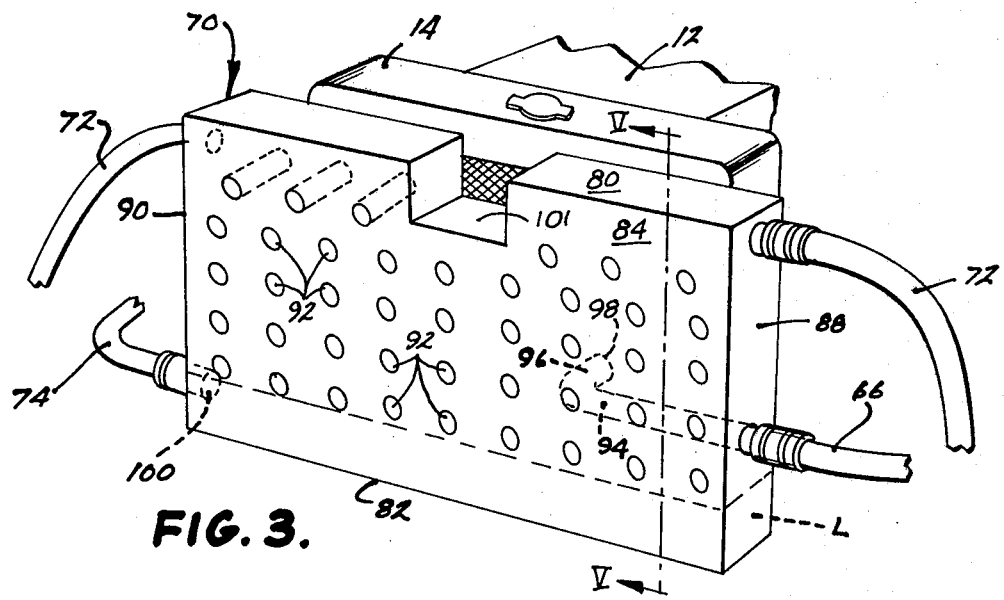
FIG. 3 is a perspective view illustrating the separating tank and a portion of the internal combustion engine and its liquid cooling system.
Figure 5:
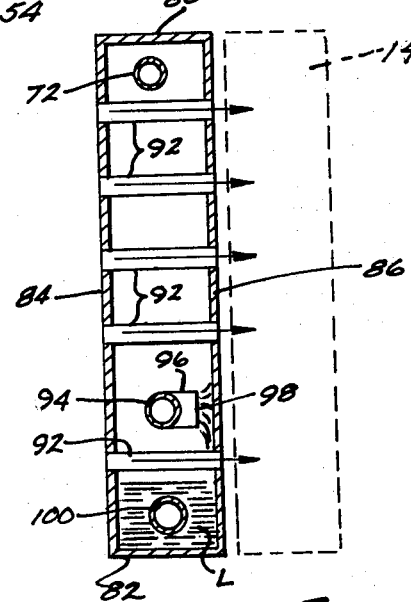
FIG. 5 is a sectional view of the separating tank taken along plane V-V of FIG. 3.

Referring to FIGS. 3 and 5, separating tank 70 comprises a generally vertically upstanding, liquid-tight tank having a width less than its height. Tank 70 includes top and bottom walls 80 and 82, front and back walls 84 and 86, and end walls 88 and 90. A plurality of tubular air passageways 92 extend completely through tank 70, through front and rear walls 84 and 86 to provide air flow passages through the tank. Tubes 92 are located over the entire walls 84, 86 except along the bottom below the level of liquid L in the tank. The liquid level is normally maintained between the bottom row of tubes 92 and the bottom of the tank. This flow of air does not communicate with the contents of the tank. When the tank 70 is mounted in its preferred position immediately ahead of the normal cooling radiator within the engine compartment of the typical vehicle, movement of the vehicle causes an air flow which passes through the passageways 92 acting both to cool the exhaust gases and liquid L within tank 70 and to allow an air flow through the core of radiator 14 to allow normal operation of the cooling system of the engine.

Insertion of the exhaust-liquid mixture from fluid conduit 66 leading from the pump 64 and receiving tank 40 is accomplished via a rigid insertion conduit or tube 94 extending through end wall 88 generally horizontally and inwardly of the tank. Insertion conduit 94 includes a right angle portion 96 ending in an outlet 98 immediately adjacent the rear wall 86 of tank 70 as is best seen in FIG. 5. The violent splashing of the mixture forced against the wall 86 from outlet 98 causes a separation of the exhaust gases from the liquid L. The separated pollutant-containing liquid falls to the bottom of the tank while the cleansed gases rise to the top of the tank and are vented to the atmosphere via conduits 72 via the pressure of the gases within tank 70. Conduits 72 are positioned adjacent the top of the tank to provide a maximum distance to separate the cleansed gases from liquid L. Outlet 98 is accordingly located immediately above the liquid level to obtain this maximum separation distance.

The pollutant-containing liquid L is removed from tank 70 via an outlet conduit 100 extending through end wall 90 at a position below the level of the liquid L in tank 70. Normally, the liquid L maintains a level above the position of conduit 100. This level varies with the engine speed because the volume of fluid pumped by pumps 64, 76 varies with that engine speed. Conduit 100 is connected to conduit 74 via suitable connection means. In order to properly fit the tank 70 in certain vehicular models, it may be necessary to provide various cut-out portions such as cut-out area 101 in the top of the tank as shown in FIG. 3. Cut-out 101 provides the space for locating the hood latch assembly of the normal vehicle. Conduits 66, 72, and 74 are all suitably connected to the tank 70 via hose con-nectors, pipe joints, or the like.

Fluid pumps 64 and 76 are of a high-head, selfpriming centrifugal type which transfer a high volume of liquid and are especially designed to transfer liquid with entrained air or gases therein. A suitable pump of this type is the Teel pump, Model No. IP746A, manufactured by Datton Electric Manufacturing Company of Chicago, Ill. Pumps 64 and 76 are normally mounted adjacent the fan and fan shaft 16 and 18 of the engine 12 and are rotatably powered thereby via bolts 102, shaft pulley 104, and pump pulleys 106 and 108 (see FIG. 1). Fluid conduits 62, 66, 74, and 78 are connected to pumps 64 and 66 as shown in FIG. 1 via suitable pipe or hose connections. These conduits, as well as conduits 60 and 72 may be either flexible rubberized or synthetic hose or rigid tubular conduits depending on the space available for installation of the system.

It has been found that the present anti-pollution exhaust system greatly reduces the hydrocarbons and carbon monoxide present in the exhaust. With a system of the type described herein installed on a 1971 Ford V-8 engine, the exhaust emissions have been reduced to about 0.1 to 0.2 percent carbon monoxide (CO) and about 60 parts per million (ppm) hydrocarbons (HC) at idle speed (600–800 rpm). At approximately 2,000 rpm, the emission levels were about 0.1–0.2 percent CO and about 35–40 ppm HC.

Accordingly, the present system provides a compact, simplified, easily maintained anti-pollution exhaust system for use with generally all types of vehicles having internal combustion engines. The system may be added to existing vehicles, or built into the vehicle when new. When mixed with the scrubbing liquid L in receiving tank 40, the exhaust gases are cleansed of pollutants including soluble gases and certain solid particles which are dissolved and retained in the liquid. The gases are thereafter separated from the pollutant-containing liquid in the separating tank and released to the atmosphere in a cooled, cleansed state.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. In combination with an internal combustion engine mounted in a vehicle, an anti-pollution exhaust system for said engine mounted on said vehicle comprising:

receiving tank means for holding a quantity of liquid including exhaust gas release means located below any quantity of liquid in said receiving tank means for inserting exhaust gases into said receiving tank means and for thoroughly mixing exhaust gases from said internal combustion engine with said liquid to form an exhaust-liquid mixture in said receiving tank;

separating tank means for holding a quantity of liquid and receiving said mixture from said receiving tank means including separating means for separating said liquid from said gases while leaving pollutants from said gases in said liquid in said separating tank means and vent means located above the liquid in the separating tank means for venting the separated, cleansed gases to the atmosphere;

means for allowing cooling air to flow against and through said separating tank means to cool any liquid and exhaust gas mixture in said separating tank means;

exhaust gas conduit means for conveying exhaust gases from said engine to said receiving tank means;

first fluid conduit means for conveying at least a portion of said exhaust-liquid mixture from said receiving tank means to said separating tank means;

second fluid conduit means for conveying fluid, and primarily said liquid, from said separating tank means back to said receiving tank means;

pump means for pumping fluid through said conduit means; and means for driving said pump means with said engine; said first and second fluid conduit means and pump means adapted to recirculate the liquid in said system for re-use whereby said exhaust gases are continuously cleansed by said liquid as they exit the engine before being released to the atmosphere.

2. The combination of claim 1 including cooling means in said exhaust gas conduit means for cooling said exhaust gases prior to their mixture with said liquid in said receiving tank means.

3. The combination of claim 2 wherein said exhaust gas conduit means includes an exhaust pipe; said exhaust gas cooling means including a portion of said pipe which is formed in a sinuous path, said pipe portion being located beneath said vehicle for exposure to the flow of air caused by movement of said vehicle for heat transfer purposes.

4. The combination of claim 3 wherein said exhaust pipe portion includes a plurality of elongated sections connected by curvilinear sections, said elongated sections extending transverse to said vehicle.

5. The combination of claim 3 wherein said exhaust pipe portion includes a plurality of elongated sections connected by curvilinear sections, said elongated sections extending lengthwise of said vehicle.

6. In combination with an internal combustion engine mounted in a vehicle, an anti-pollution exhaust system for said engine mounted on said vehicle comprising:
receiving tank means for holding a quantity of liquid including exhaust gas release means located below any quantity of liquid in said receiving tank means for inserting exhaust gases into said receiving tank means and for thoroughly mixing exhaust gases from said internal combustion engine with said liquid to form an exhaust-liquid mixture in said receiving tank;

separating tank means for holding a quantity of liquid and receiving said mixture from said receiving tank means including separating means for separating said liquid from said gases while leaving pollutants from said gases in said liquid in said separating tank means and vent means located above the liquid in the separating tank means for venting the separated, cleansed gases to the atmosphere;

exhaust gas conduit means for conveying exhaust gases from said engine to said receiving tank means;

first fluid conduit means for conveying at least a portion of said exhaust-liquid mixture from said receiving tank means to said separating tank means;

second fluid conduit means for conveying fluid, and primarily said liquid, from said separating tank means back to said receiving tank means;

pump means for pumping fluid through said conduit means;

means for driving said pump means with said engine; said first and second fluid conduit means and pump means adapted to recirculate the liquid in said system for re-use whereby said exhaust gases are continuously cleansed by said liquid as they exit the engine before being released to the atmosphere;

said receiving tank means further including a liquid-tight receiving tank, said tank being filled with liquid to a predetermined level, said means below the level of said liquid for mixing exhaust gases with liquid including an insertion conduit connected to said exhaust gas conduit means and extending internally to said tank including an outlet opening below said liquid level in said receiving tank for releasing said exhaust gases in said liquid; a return conduit connected to said second fluid conduit means and extending internally of said tank including a return outlet opening adjacent one wall inside said receiving tank for releasing said returned liquid against said tank wall to agitate the liquid to facilitate mixing of said exhaust gases therewith in said receiving tank; and at least one outlet conduit connected to said first fluid conduit means near the top of said receiving tank above said liquid level for releasing said liquid-gas mixture from said receiving tank.

7. The combination of claim 6 wherein said receiving tank is positioned in the engine compartment of said vehicle and includes valve means on the bottom of said tank for draining said liquid from said tank, an aperture in the top of said tank for replenishing said liquid and closure means for said top aperture.

8. In combination with an internal combustion engine mounted in a vehicle, an anti-pollution exhaust system for said engine mounted on said vehicle comprising:
receiving tank means for holding a quantity of liquid including exhaust gas release means located below any quantity of liquid in said receiving tank means for inserting exhaust gases into said receiving tank means and for thoroughly mixing exhaust gases from said internal combustion engine with said liquid to form an exhaust-liquid mixture in said receiving tank;

separating tank means for holding a quantity of liquid and receiving said mixture from said receiving tank means including separating means for separating said liquid from said gases while leaving pollutants from said gases in said liquid in said separating tank means and vent means located above the liquid in the separating tank means for venting the separated, cleansed gases to the atmosphere;

exhaust gas conduit means for conveying exhaust gases from said engine to said receiving tank means;

first fluid conduit means for conveying at least a portion of said exhaust-liquid mixture from said receiving tank means to said separating tank means;

second fluid conduit means for conveying fluid, and primarily said liquid, from said separating tank means back to said receiving tank means;

pump means for pumping fluid through said conduit means;

means for driving said pump means with said engine; said first and second fluid conduit means and pump means adapted to recirculate the liquid in said system for re-use whereby said exhaust gases are continuously cleansed by said liquid as they exit the engine before being released to the atmosphere;

said separating tank means further including a liquid-tight separating tank, said tank being filled with liquid to a predetermined level; said separating means including an insertion conduit connected to said first conduit means, extending internally of said tank, and having an outlet opening adjacent an internal wall of said separating tank above said liquid level for releasing said mixture against said wall to separate said pollutant-containing liquid from said cleansed gases; an outlet conduit connected to said second fluid conduit means and extending internally of said tank below said liquid level for removing said pollutant-containing liquid from said tank; and at least one vent conduit adjacent the top of said separating tank for releasing said cleansed gases into said atmosphere.

9. The combination of claim 8 wherein said engine includes a cooling radiator, said separating tank being located in said vehicular engine compartment immediately in front of said cooling radiator and has top, bottom, front, back, and end walls and includes a plurality of tubular air passages extending generally horizontally through said air tank between said front and back walls, said air passages providing a flow of air when said vehicle is moving to cool said separating tank and said cooling radiator.

10. In combination with an internal combustion engine mounted in a vehicle, an anti-pollution exhaust system for said engine mounted on said vehicle comprising:

receiving tank means for holding a quantity of liquid including exhaust gas release means located below any quantity of liquid in said receiving tank means for inserting exhaust gases into said receiving tank means and for thoroughly mixing exhaust gases from said internal combustion engine with said liquid to form an exhaust-liquid mixture in said receiving tank;

separating tank means for holding a quantity of liquid and receiving said mixture from said receiving tank means including separating means for separating said liquid from said gases while leaving pollutants from said gases in said liquid in said separating tank means and vent means located above the liquid in the separating tank means for venting the separated, cleansed gases to the atmosphere;

exhaust gas conduit means for conveying exhaust gases from said engine to said receiving tank means;

first fluid conduit means for conveying at least a portion of said exhaust-liquid mixture from said receiving tank means to said separating tank means;

second fluid conduit means for conveying fluid, and primarily said liquid, from said separating tank means back to said receiving tank means;

pump means for pumping fluid through said conduit means;

means for driving said pump means with said engine; said first and second fluid conduit means and pump means adapted to recirculate the liquid in said system for re-use whereby said exhaust gases are continuously cleansed by said liquid as they exit the engine before being released to the atmosphere;

said separating tank means further including a plurality of air passages extending therethrough to provide a cooling air flow when said vehicle is in motion.

11. In combination with an internal combustion engine mounted in a vehicle, an anti-pollution exhaust system for said engine mounted on said vehicle comprising:

receiving tank means for holding a quantity of liquid including exhaust gas release means located below any quantity of liquid in said receiving tank means for inserting exhaust gases into said receiving tank means and for thoroughly mixing exhaust gases from said internal combustion engine with said liquid to form an exhaust-liquid mixture in said receiving tank;

separating tank means for holding a quantity of liquid and receiving said mixture from said receiving tank means including separating means for separating said liquid from said gases while leaving pollutants from said gases in said liquid in said separating tank means and vent means located above the liquid in the separating tank means for venting the separated, cleansed gases to the atmosphere;

exhaust gas conduit means for conveying exhaust gases from said engine to said receiving tank means;

first fluid conduit means for conveying at least a portion of said exhaust-liquid mixture from said receiving tank means to said separating tank means;

second fluid conduit means for conveying fluid, and primarily said liquid, from said separating tank means back to said receiving tank means;

pump means for pumping fluid through said conduit means;

means for driving said pump means with said engine; said first and second fluid conduit means and pump means adapted to recirculate the liquid in said system for re-use whereby said exhaust gases are continuously cleansed by said liquid as they exit the engine before being released to the atmosphere;

said pump means including a fluid pump in each of said first and second fluid conduit means; said engine including a shaft and a cooling fan mounted on said shaft and rotated by said engine; said drive means including belt and pulley means engaging said fan shaft for driving said fluid pumps.

12. The combination of claim 1 wherein said receiving tank means and said separating tank means each include a quantity of liquid for cleansing said exhaust gases from said engine, said liquid being selected from the group including water and antifreeze of the ethylene glycol based type.

13. An anti-pollution exhaust system for vehicular mounted internal combustion engines comprising:

receiving tank means for holding a quantity of liquid including exhaust gas release means located below any quantity of liquid in said receiving tank for inserting exhaust gases from an internal combustion engine into said receiving tank means and for thoroughly mixing exhaust gases with said liquid to form an exhaust-liquid mixture in said receiving tank means;

separating tank means for holding a quantity of liquid and for receiving said mixture from said receiving tank means including separating means for separating said liquid from said gases while leaving pollutants from said gases in said liquid in said separating tank means and vent means located above the liquid in said separating tank means for venting the separated, cleansed gases to the atmosphere;

exhaust gas conduit means for conveying exhaust gases from the engine to said receiving tank means, said exhaust gas conduit means including means for cooling said exhaust gases in said exhaust gas conduit means;

first fluid conduit means for conveying at least a portion of said exhaust-liquid mixture from said receiving tank means to said separating tank means;

said separating means including outlet means connected to said first fluid conduit means and located immediately adjacent an interior wall of said separating tank means for releasing said fluid from said receiving tank violently against said interior wall to separate said liquid from said gases;

second fluid conduit means for conveying fluid, and primarily said liquid, from said separating tank means back to said receiving tank means;

pump means for pumping fluid through said conduit means; and means for driving said pump with the engine whereby said exhaust gases are cleansed by said liquid before being released to the atmosphere.

14. The anti-pollution exhaust system of claim 13 wherein said exhaust gas conduit means includes an exhaust pipe; said exhaust gas cooling means including a portion of said pipe which is formed in a sinuous path, said pipe portion being exposed to the atmosphere whereby the flow of air caused by movement of the vehicle on which said system is adapted to be mounted contacts said pipe portion to transfer heat from said exhaust gases.

15. The anti-pollution exhaust system of claim 13 wherein said receiving tank means includes a liquid-tight receiving tank, said tank being filled with liquid to a predetermined level; said exhaust gas release means including an insertion conduit connected to said exhaust gas conduit means and extending internally of said tank including an outlet opening below said liquid level in said receiving tank for releasing said exhaust gases in said liquid; a return conduit connected to said second fluid conduit means and extending internally of said tank including a return outlet opening adjacent one wall inside said receiving tank for releasing said returned liquid against said tank wall to agitate the liquid to facilitate mixing of said exhaust gases therewith in said receiving tank; and at least one outlet conduit connected to said first fluid conduit means near the top of said receiving tank above said liquid level for releasing said liquid gas mixture from said receiving tank.

16. The anti-pollution exhaust system of claim 13 wherein said separating tank means includes a liquid-tight separating tank, said tank being filled with liquid to a predetermined level; said outlet means including an insertion conduit connected to said first conduit means, extending internally of said tank, and having an outlet opening adjacent an internal wall of said separating tank above said liquid level for releasing said mixture against said wall to separate said pollutant-containing liquid from said cleansed gases; an outlet conduit connected to said second fluid conduit means and extending internally of said tank below said liquid level for removing said pollutant-containing liquid from said tank; and at least one vent conduit adjacent the top of said separating tank for releasing said cleansed gases into said atmosphere.

17. The anti-pollution exhaust system of claim 13 wherein said pump means includes a fluid pump in each of said first and second fluid conduit means; said drive means including means for transferring power from the internal combustion engine to each of said fluid pumps for operating the same.

18. The anti-pollution exhaust system of claim 13 wherein said receiving tank means and said separating tank means each include a quantity of liquid for cleansing said exhaust gases from said engine, said liquid being selected from the group including water and antifreeze of the ethylene glycol based type.

19. The combination of claim 1 wherein said means for allowing cooling air to flow against and through said separating tank means include a plurality of air passages extending completely through said separating tank whereby air passes therethrough when said separating tank is positioned on a vehicle to be contacted by a stream of moving air.

* * * * *